(12) United States Patent
Zhong et al.

(10) Patent No.: US 7,231,107 B1
(45) Date of Patent: Jun. 12, 2007

(54) FLEXIBLE WAVELENGTH SELECTIVE SWITCH FABRIC WITH ARBITRARY ADD AND DROP CAPABILITY

(75) Inventors: Shan Zhong, Ellicott City, MD (US); Jean-Luc Archambault, Severna Park, MD (US)

(73) Assignee: Ciena Corporation, Linthicum, MD (US)

( * ) Notice: Subject to any disclaimer, the term of this patent is extended or adjusted under 35 U.S.C. 154(b) by 131 days.

(21) Appl. No.: 10/768,029

(22) Filed: Feb. 2, 2004

Related U.S. Application Data

(60) Provisional application No. 60/443,899, filed on Jan. 31, 2003.

(51) Int. Cl.
*G02B 6/26* (2006.01)

(52) U.S. Cl. .......................................... 385/24; 385/17

(58) Field of Classification Search .................... None
See application file for complete search history.

(56) References Cited

U.S. PATENT DOCUMENTS

| | | | |
|---|---|---|---|
| 5,446,809 A * | 8/1995 | Fritz et al. ..................... 385/17 |
| 5,778,118 A | 7/1998 | Sridhar | |
| 6,014,480 A * | 1/2000 | Baney ........................... 385/24 |
| 6,192,172 B1 * | 2/2001 | Fatehi et al. ................... 385/17 |
| 6,282,361 B1 * | 8/2001 | Nishimura et al. .......... 385/140 |
| 6,341,025 B1 | 1/2002 | Mizrahi et al. | |
| 6,459,516 B1 | 10/2002 | Mizrahi et al. | |
| 6,466,346 B1 | 10/2002 | Mizrahi et al. | |
| 6,487,336 B1 * | 11/2002 | Yao ............................... 385/24 |
| 6,738,540 B2 * | 5/2004 | Marom ......................... 385/17 |
| 6,771,905 B1 * | 8/2004 | Bortz ........................... 398/45 |
| 2002/0186434 A1 * | 12/2002 | Roorda et al. .............. 359/128 |
| 2003/0138252 A1 * | 7/2003 | Paiam et al. ................. 398/49 |
| 2003/0170025 A1 * | 9/2003 | Bortolini et al. ............. 398/50 |

* cited by examiner

*Primary Examiner*—Rodney Bovernick
*Assistant Examiner*—Mike Stahl
(74) *Attorney, Agent, or Firm*—Merek, Blackmon & Voorhees, LLC

(57) ABSTRACT

A flexible wavelength switch fabric may be implemented with multiple groups of reconfigurable blocking filters or with multiple multi-in, single out wavelength selective switches. The behaviors of reconfigurable blocking filters are individually settable, such as channel blocking, channel spacing, transmission rate, and default blocking state. Add and drop taps may be added to provide arbitrary add/drop capability. Optical splitters/combiners used may be tunable so that insertion losses may be minimized for the overall network.

9 Claims, 9 Drawing Sheets

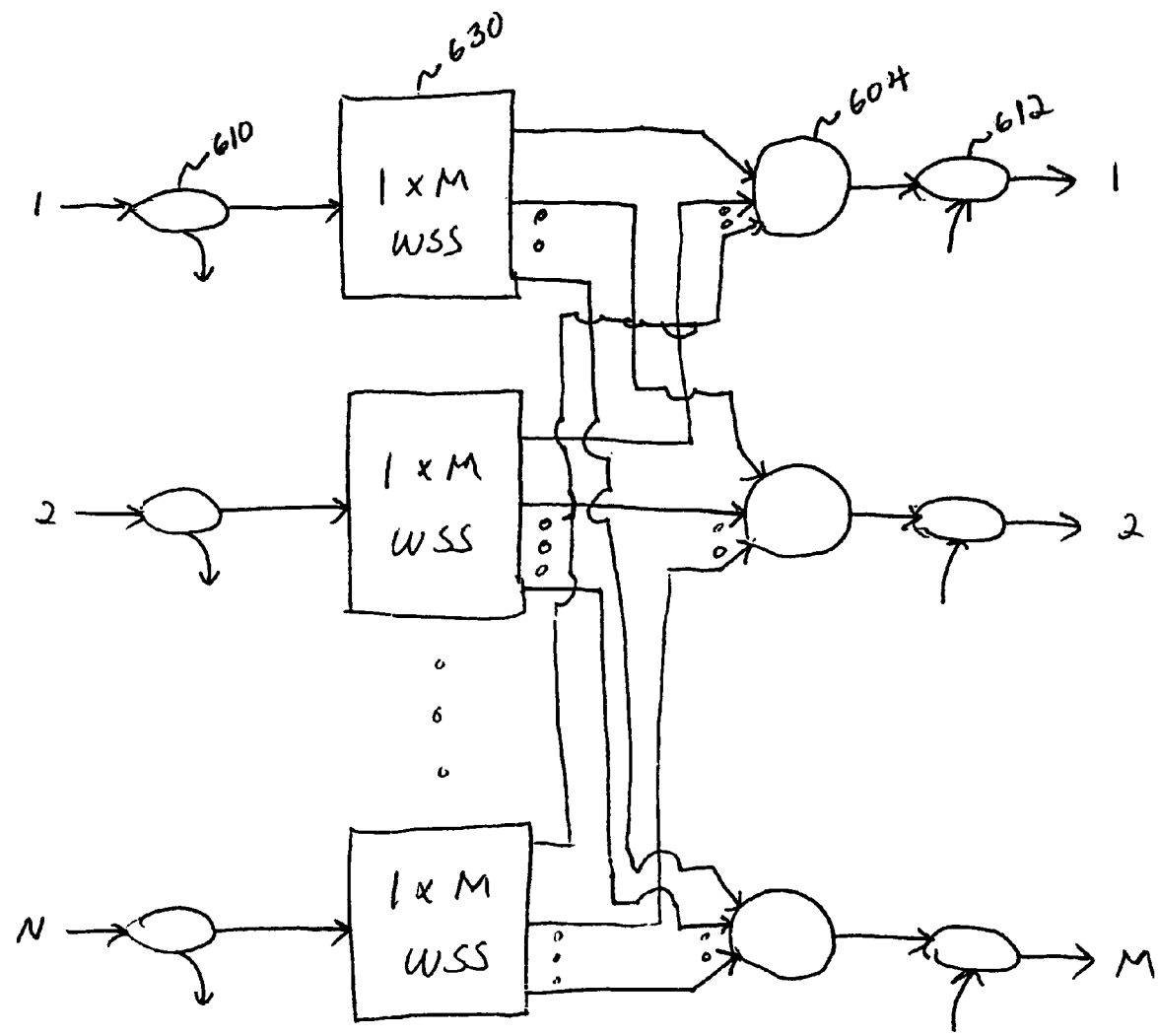
Figure 6B  600-B

FLEXIBLE WAVELENGTH SELECTIVE SWITCH FABRIC WITH ARBITRARY ADD AND DROP CAPABILITY

PROVISIONAL APPLICATION

The present application claims priority under 35 U.S.C. § 120 of a provisional application 60/443,899 filed on Jan. 31, 2003, the entirety of which is hereby incorporated by reference.

FIELD OF THE INVENTION

The field of the invention generally relates to optical networks. More particularly, the invention relates to flexible wavelength selective switch (WSS) fabrics. Such WSS fabrics are useful, for example, in wavelength division multiplexed (WDM) networks.

BACKGROUND OF THE INVENTION

Optical networks provide a tremendous capacity advantage. Entities wishing to take advantage of the advantages that optical networks offer, must usually make a decision based on their current needs (which may be modest and predictable) and their future needs (which are typically unpredictable). An entity may decide to acquire a network to meet its short-term needs because of it's present financial constraints.

However, this approach carries a risk that the network will be insufficient and may cost more in the long run because the entire network has to be replaced due to inadequacies of the network. Also, any upgrades may require the network to be shut down prior to the upgrade. Such a shut down is costly since no service can be provided, which in turn shuts down a revenue stream. In an industry such as telecommunications, shut down can be extremely costly indeed.

Another approach is to project a long-term need and acquire a network with capabilities to meet the long-term need. This approach also carries inherent risks as well. In the short run, the investment in the network will be wasted to the extent that there will be excess capacity. In the long run, the needs of the entity may change in a different direction and the acquired network will not be able to handle the changed needs efficiently.

Conventional add/drop nodes utilize one of two architectures—broadcast and blocking architectures. The broadcast architecture is an architecture in which a copy of an optical signal is dropped to a drop path of a node while another copy continues on a through path. Multiple channels are not allowed to occupy same portions of the spectrum inside the transmission medium due to interference. Thus, channels that occupy a specific portion of wavelengths (or spectrum) prior to the node are not available for use subsequent to the add/drop connectivity. However, other unused portions of the spectrum are available for use subsequent to the node. The broadcast architecture may be sufficient in wavelength division multiplexing (WDM) systems with large aggregate channel capacities.

In a blocking architecture, at least the through path (and often the drop path) is spectrally filtered. This permits wavelength reuse for add/drops in subsequent portions of the network. The reuse of wavelengths provides advantages by making additional channels available for connectivity, thereby increasing the total capacity available on the communications network.

Wavelength selective switches (WSS) (an optical cross connect (OXC) with granularity of single wavelength), for example an N×N WSS, have been widely proposed and studied in the last few years as a cost-effective solution to provide a transparent by-pass for WDM express traffic at degree n nodes in optical networks. WSS's provide an optical cross-connect function with single channel granularity, where any WDM channel from any of the N inputs can be routed to any of the N outputs.

However, even the capabilities of conventional WSS may not be enough to meet the unanticipated demands. Typical implementation of WSS in commercial systems is limited by the maturity of optical components.

An approach is desired where the system deployed is extremely flexible so that future demands on the optical networks, not yet foreseen, may be handled with ease. As the capacity demand grows and changes, it is desired to provide a flexible system that can meet the increased demand and the type of demand changes. It is also desired to have the capability to recover previously inaccessible capacity and without service disruptions.

BRIEF DESCRIPTION OF THE DRAWINGS

Features of the present invention will become more fully understood to those skilled in the art from the detailed description given herein below with reference to the drawings, which are given by way of illustrations only and thus are not limitative of the invention, wherein:

FIG. 6B illustrates a flexible wavelength selective fabric with arbitrary add/drop capability utilizing 1×M wavelength selective switches according to an embodiment of the present invention.

DETAILED DESCRIPTION

For simplicity and illustrative purposes, the principles of the present invention are described by referring mainly to exemplary embodiments thereof. The same reference numbers and symbols in different drawings identify the same or similar elements. Also, the following detailed description does not limit the invention. The scope of the invention is defined by the claims and equivalents thereof.

The expression "optically connects" or "optically communicates" as used herein refers to any connection, coupling, link or the like by which optical signals carried by one optical element are imparted to the "connecting element." Such "optically communicating" devices are not necessarily directly connected to one another and may be separated by intermediate optical components and/or devices. Likewise, the expressions "connection", "operative connection", and "optically placed" as used herein are relative terms and do not necessarily require a direct physical connection.

As noted above, it is desirable for the WSS fabric to be flexible. This necessitates that some or all of the elements that make up the WSS fabric be combined in a flexible manner. Also, it is desirable that the individual elements themselves be flexible, i.e. dynamically adjustable.

Figure 1:
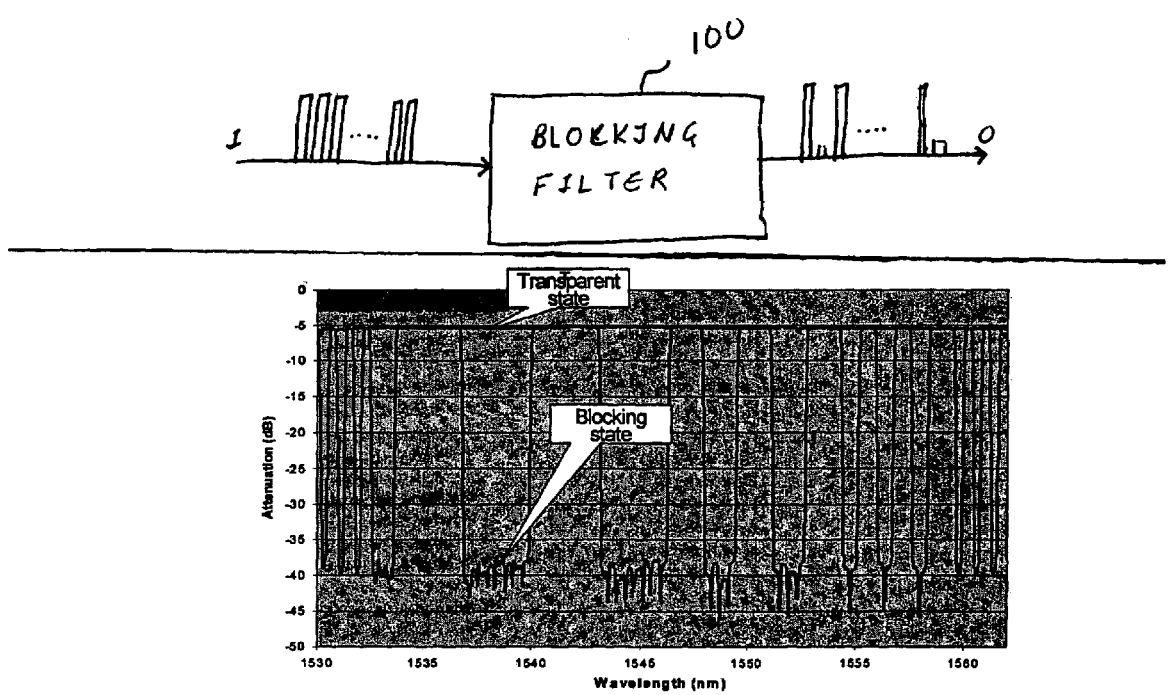
FIG. 1 illustrates a blocking filter according to an embodiment of the present invention.

One way to enhance flexibility is to use optical blocking filters as part of the elements. FIG. 1 illustrates a blocking filter 100 according to an embodiment of the present invention. The blocking filter 100 is one-in, one-out device with its transmission spectrum being uniformly sliced into individual pixels (or channels or wavelengths) with certain channel spacing. Each channel may be set to minimum attenuation level (transparent state) or maximum attenuation level (blocking state).

Figure 2A:
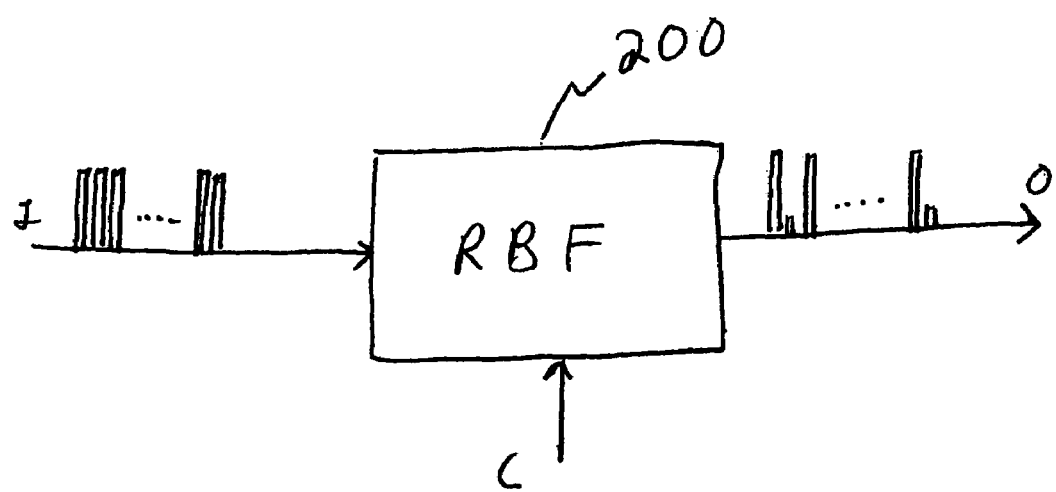
FIG. 2A illustrates a block diagram of a blocking filter according to an embodiment of the present invention.

A block diagram of a reconfigurable blocking filter (RBF) 200 is shown in FIG. 2A. The RBF 200 behaves in a similar manner as the blocking filter 100 illustrated in FIG. 1 in that a spectrum of channels (optical input signal) is received at its input and a subset of channels is blocked while other channels are passed through to the output.

In addition, the RBF 200 receives control signals. The RBF 200 is able adjust its filtering behavior depending on the control signals received. The adjustment may be performed dynamically, i.e. the behavior of the RBF 200 may be changed as needed without stopping its operation. In this manner, the service provided by the RBF 200 need not be interrupted.

Based on the control signals, the RBF 200 may be adjusted to modify which channels are to be blocked and which channels are to be passed through. In other words, the selection of channels blocked or transmitted may be adjustable.

Figure 2B:
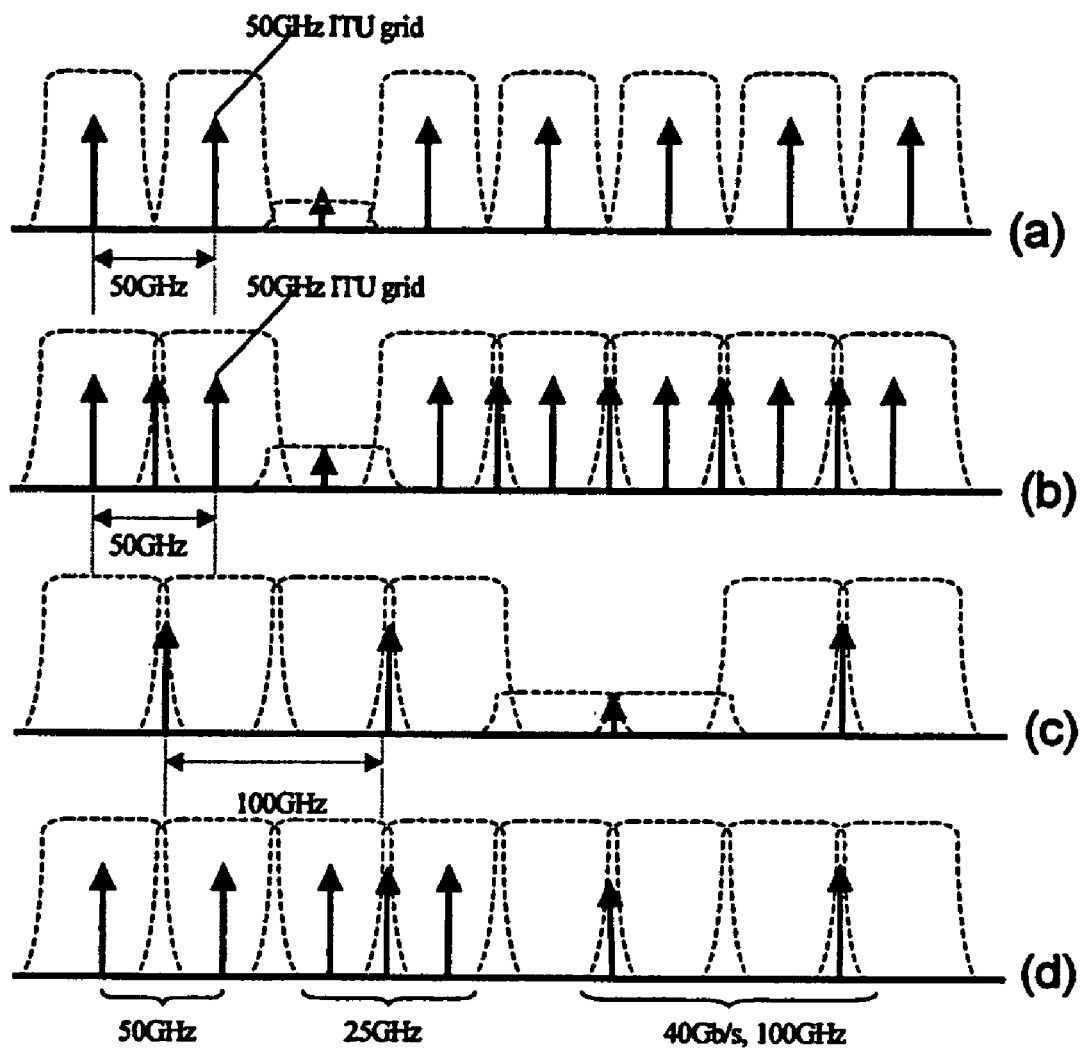
FIG. 2B illustrates transmission profiles of blocking filters according to an embodiment of the present invention.

The flexibility of the RBF 200 is further explained with reference to FIG. 2B, which illustrates transmission profiles of blocking filters. A transmission profile of a typical optical blocking filter is limited. For example, the transmission profile of a typical blocking filter has large gaps (few tenths dBs to few dBs) between adjacent channels as shown in FIG. 2B($a$). Thus the typical blocking filter can only support fixed channel plan.

However, the RBF 200 may be seamless with negligible attenuation and with negligible group delay ripple. For example, the attenuation may be less than 0.2 dB the group delay ripple may be less than 3 ps. So in addition to the traditional 50 GHz spaced system, the RBF 200 may be used in a WSS fabric to support 25 GHz spaced, 2.5 Gb/s or 10 Gb/s transmission (see FIG. 2B($b$)). The RBF 200 may also be adjusted to support 100 GHz spaced, 40 Gb/s transmission (see FIG. 2B($c$)). Further yet, hybrid channel spacing and hybrid data rate transmission may be supported (see FIG. 2B($d$)) where a single RBF supports multiple spacing with multiple transmission rates.

It should be noted that the channel spacings and data transmission rates are not limited to the particular one listed above. In short, the RBF 200 allows arbitrary selection of channels to block or to transmit, arbitrary channel spacing between any adjacent channels, as well as adjustment of the wavelengths that define the channels themselves.

Also, the default state of the RBF 200 may be "blocking." This minimizes the impact from failure of the RBF 200 in the optical network. If the RBF 200 was powered down, it would only break one single link and would not affect any other link traffics.

Figure 3:
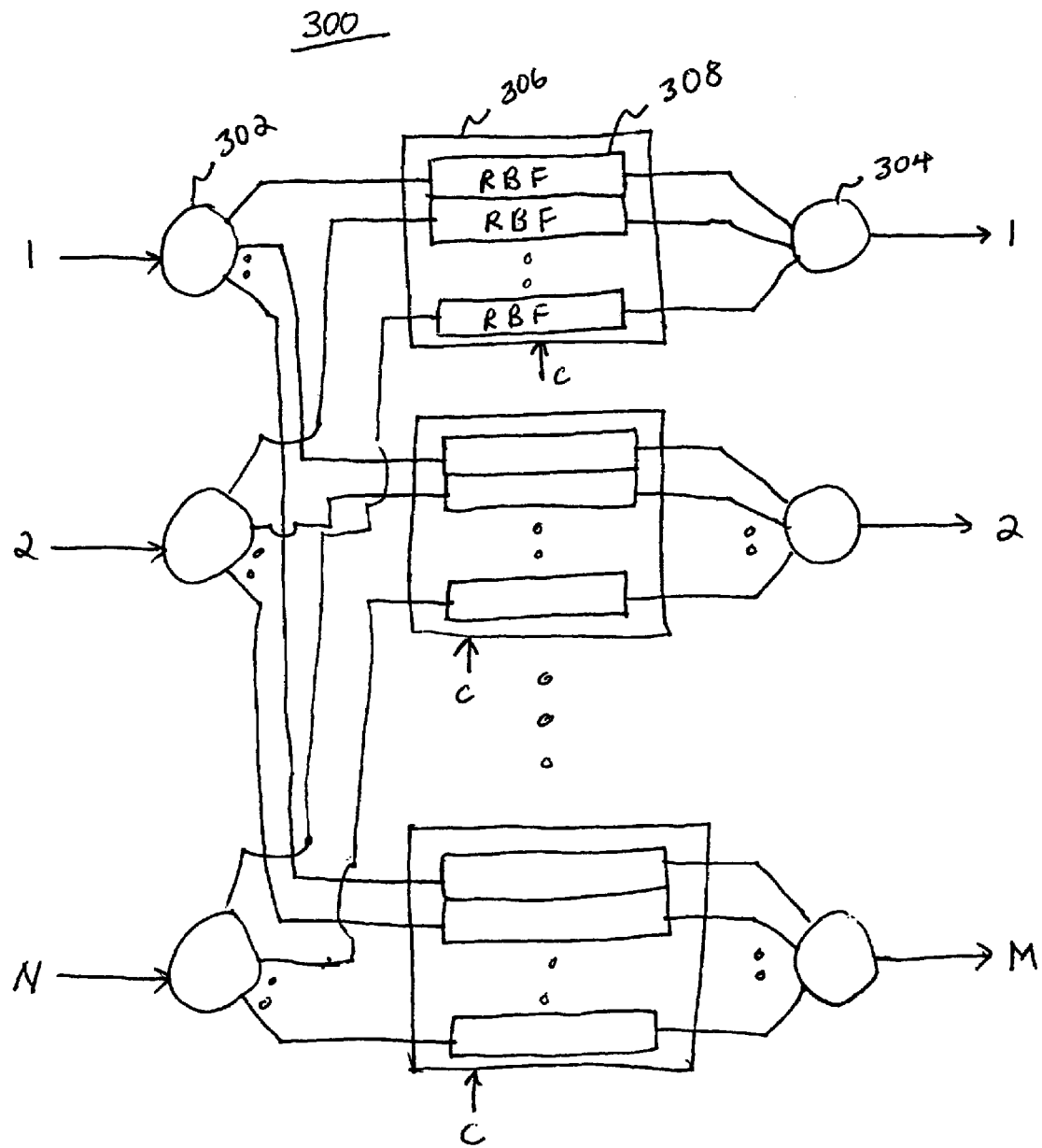
FIG. 3 illustrates a flexible wavelength selective switch fabric according to an embodiment of the present invention.

FIG. 3 illustrates a flexible wavelength selective switch fabric (also simply WSS fabric) 300 according to an embodiment of the present invention. The WSS fabric 300 is an example of a N×M WSS fabric, i.e. the WSS fabric 300 can receive N inputs and output M outputs. The WSS fabric 300 may include a plurality of optical splitters 302, a plurality of signal switching devices 306 with each signal switching device 306 receiving inputs from some or all optical splitters 302, and a plurality of optical combiners 304 with each optical combiner 304 combining some or all outputs from a corresponding signal switching device and outputting a result.

In an embodiment, a particular optical splitter 302 includes at least one input and a plurality of outputs. The input of the optical splitter 302 is optically connected to an external signal source and receives an input signal from the external source. The plurality of outputs of the optical splitter 302 is optically connected to some or all of the plurality of the signal switching devices 306.

While not a requirement, it is preferred that the particular optical splitter 302 includes at least M outputs such that input signal from the external source can be directed to each of the M signal switching devices 306. This enhances the flexibility of the WSS fabric 300.

In an embodiment, a particular signal switching device 306 includes a plurality of RBFs 308. One or more RBF 308 may be like the RBF 200 illustrated in FIGS. 2A and 2B. Each RBF 308 receives a split signal from one of the plurality of optical splitters 302 and outputs a filtered signal to the optical combiner 304 corresponding to the particular signal switching device 306.

While not a requirement, again to enhance the flexibility of the WSS fabric 300, it is preferred that the particular signal switching device 306 includes N RBFs 308 so that split signal from each optical splitter 302 may be filtered.

In an embodiment, a particular optical combiner 304 combines one or more filtered outputs from a corresponding signal switching device 306 and outputs the result. While not a requirement, again to enhance the flexibility of the WSS fabric 300, it is preferred that the particular optical combiner 304 combines all N filtered outputs from the corresponding signal switching device 306.

Thus, in a fully connected N×M switch fabric, there are N optical splitters 302, M signal switching devices 304, and M optical combiners 304. Each optical splitter 302 outputs to each of the M signal switching devices 306; each signal switching device 306 receives N split signals from the optical splitters 302 and outputs N filtered signals to the corresponding optical combiner 304; and each optical combiner 304 combines the N filtered signals received from the corresponding signal switching device 306 and outputs the result.

The signal switching device 306 also receives one more control signals C to control the behavior of the signal switching device 306. While not shown, it should be noted that each RBF 308 receives individual control signals based on the control signals C. The control signals applied to each RBF 308 may be independent of control signals applied to other RBFs 308.

As noted above, the RBFs 308 may be controlled to adjust selection of channels to block or to transmit, adjust channel spacing between any adjacent channels, as well as to adjust the wavelengths that define the channels themselves for that particular RBF 308.

Through the use of the RBFs, the signal switching device 306 may receive the split optical signals from the optical splitters 302, selectively filter the corresponding split signal received from each optical splitter 302 based on the control signals applied, and output the filtered signals to the corresponding optical combiner 304.

The N×M WSS fabric 300 shown in FIG. 3 is an example of a "broadcast and select" architecture. The broadcast and select architecture includes features such as wavelength multicasting, capability of building higher ordered switching fabrics by combining multiple WSS fabric 300, and capability of building buffered switch fabric for optical packet switching or optical burst switching.

Figure 4A:
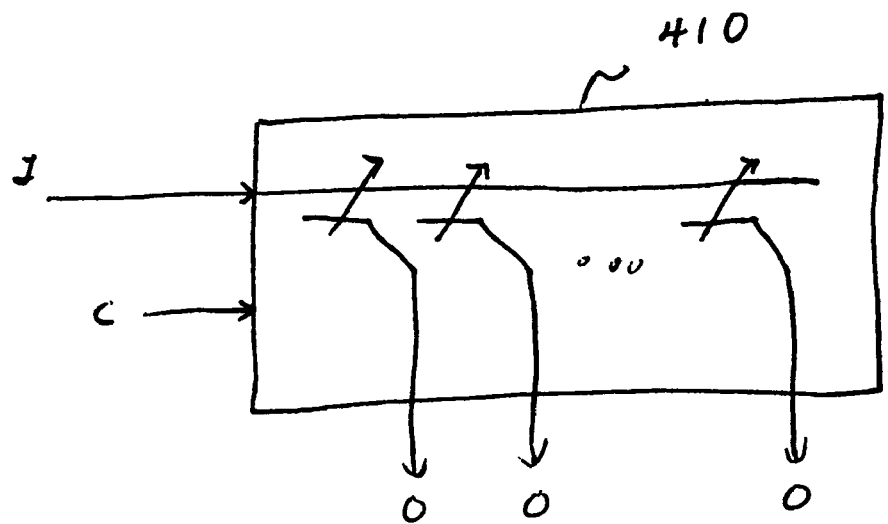
FIG. 4A illustrates a tunable optical splitter according to an embodiment of the present invention.
Figure 4B:
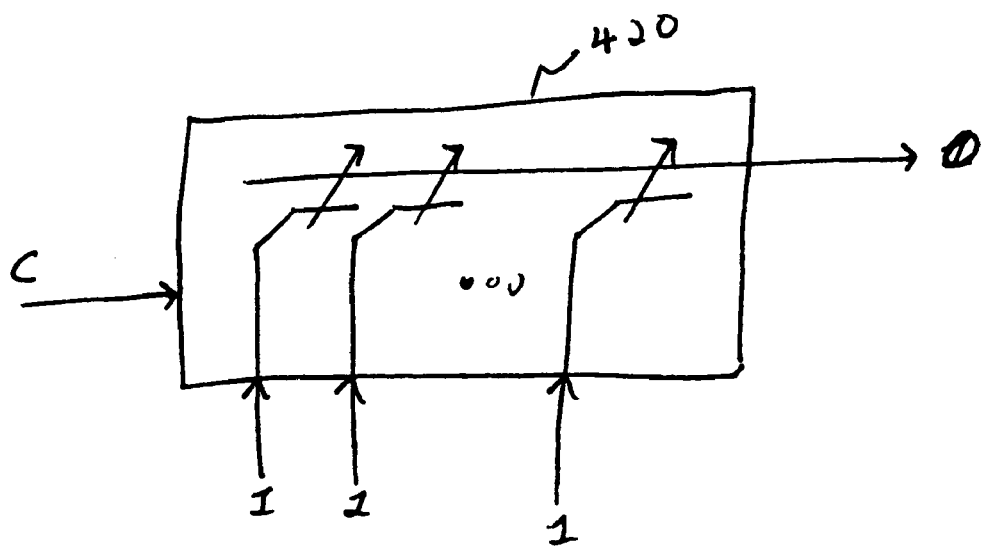
FIG. 4B illustrates a tunable optical combiner according to an embodiment of the present invention.

To increase the performance and to increase the reliability of the WSS fabric 300, one or more of the optical splitters 302 and/or one or more of the optical combiners 304 may be tunable. FIGS. 4A and 4B illustrate embodiments of a tunable optical splitter 410 and tunable optical combiner 420, respectively.

Like typical optical splitters, the tunable splitter 410 receives an input optical signal and splits/copies the input signal to multiple outputs. However, the signal power level for each output can be manipulated for the tunable splitter 410. The behavior of the tunable splitter 410 may be modified as needed through application of appropriate control signals C.

The tunable combiner 420 works in a mirror fashion to the tunable splitter 410. The tunable combiner 420 receives inputs from multiple input sources like a typical optical combiner. However, the power level for each input signal contributing to the output of the tunable combiner 420 can be manipulated. The behavior of the tunable combiner 420 may be modified as needed through application of appropriate control signals C.

Referring back to FIG. 3, one or more of the optical splitters 302 may be tunable splitters 410. Also, one or more of the optical combiners 304 may be tunable combiners 420. The usefulness of the tunable splitters 410 and combiners 420 may be explained as follows.

Any optical network, including WSS, must account for insertion losses. Insertion losses degrade network's performance or reliability or both. The smaller insertion loss of WSS, the smaller penalty it generates for overall system performance. For the WSS architecture described in FIG. 3, different sized WSS typically exhibit differing insertion loss characteristics. For example, a 2×2 switch may exhibit different insertion loss characteristics than a 3×3 switch. By using the tunable splitters 410 and combiners 420 to tune the outputs and inputs, respectively, the insertion loss budget for the overall network or system may be optimized (minimized), particularly for those nodes need upgrade from 2×2 switch to higher degree switches.

Figure 5:
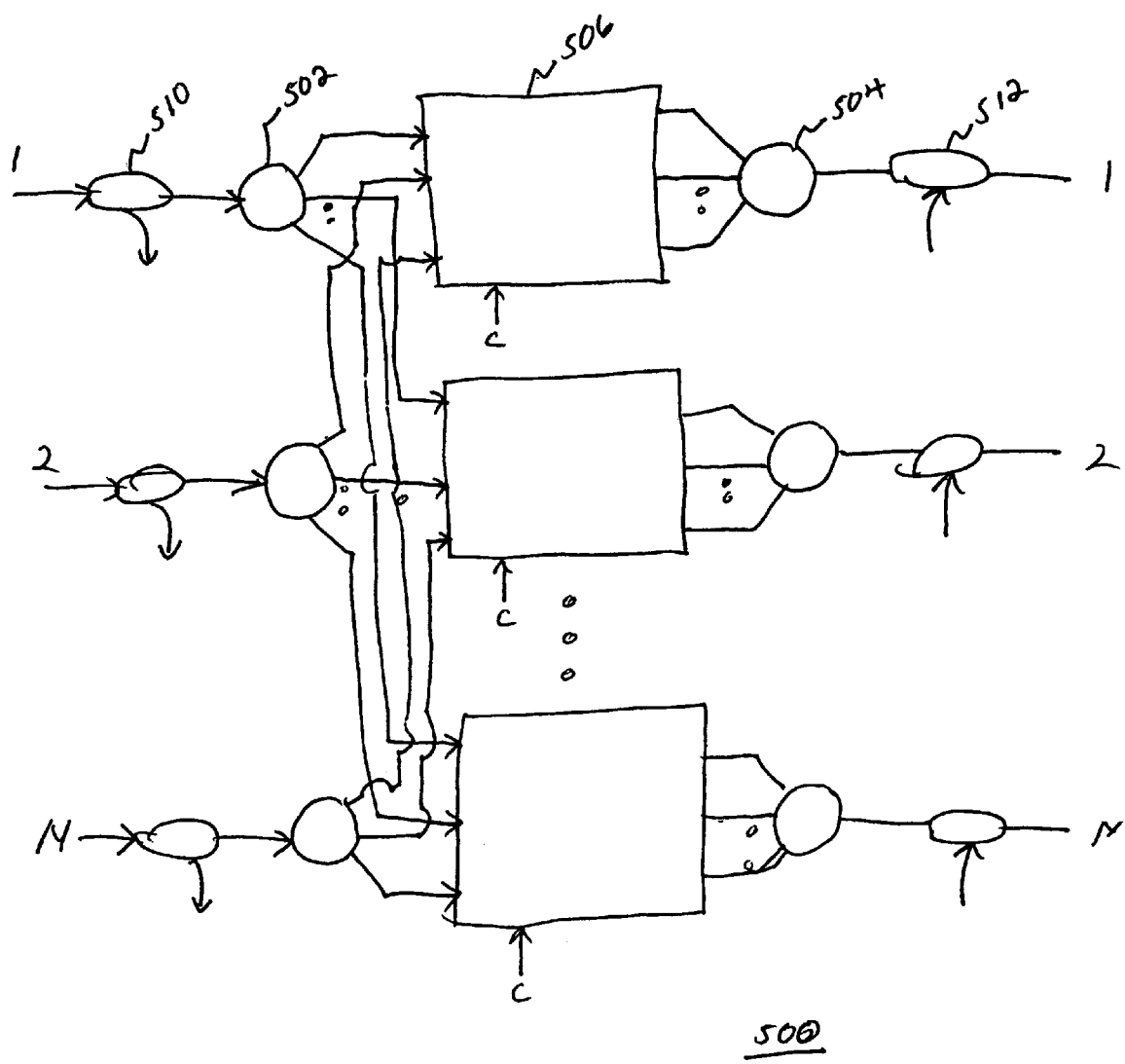
FIG. 5 illustrates a flexible wavelength selective fabric with arbitrary add/drop capability utilizing reconfigurable blocking filter based signal switching devices according to an embodiment of the present invention.

To enhance the functionality of the WSS fabric, add and drop taps may be included. FIG. 5 is an illustration of a flexible wavelength selective fabric 500 with arbitrary add/drop capability. Similar to the WSS fabric 300, the WSS fabric 500 includes a plurality of optical splitters 502, a plurality of signal switching devices 506, and a plurality of optical combiners 504. The WSS fabric 500 may also be an N×M switch fabric.

It should be noted that some or all optical splitters 502 and/or some or all optical combiners 504 may be tunable.

While not shown, some or all signal switching devices 506 may be RBF based such as the signal switching devices 306 shown in FIG. 3.

However, the WSS fabric 500 also includes a plurality of optical drop taps 510 and a plurality of optical add taps 512. The optical drop tap 510 may include an input optically connected to the external source to receive the signal from the external source and outputs copies of the received signal. One of the outputs is optically connected to the input of the optical splitter 502. At least one other output of the optical drop tap 10 is available to a local destination for local use.

In an embodiment, the optical drop tap 510 may be implemented with a simple optical coupler. In another embodiment, the drop tap 510 may be implemented with a multiple-output optical splitter. The multiple-output optical splitter may be tunable.

In a further embodiment, the functionalities of corresponding optical drop tap 510 and optical splitter 502 may be combined by a single optical splitter. For example, the single optical splitter may include outputs more than necessary for connection to the plurality of signal switching devices 306 (for example, more than M). As such, the extra output may be used to provide the signal to the local destination. The single optical splitter may be tunable.

It should be noted that if the single optical splitter includes more than M outputs, it ensures that an extra output is available for connection to the local destination. However, this is not strictly necessary. The single optical splitter may include M or less outputs if the WSS fabric 500 is not fully connected. For example, the single optical splitter may not need to be have outputs connected to each and every signal switching device 506. All that is required is that the single optical splitter include more outputs than necessary to connect to the desired signal switching devices 506.

On the output side, the optical add tap 512 may include an output connected to the external destination. The optical add tap 512 may also include inputs to receive the output from the optical combiner 504 as well as to receive input from a local source. The optical add tap 512 combines the output from the optical combiner 504 and the signal from the local source and outputs the combination to the external destination.

In an embodiment, the optical add tap 512 may be implemented with a simple optical coupler. In another embodiment, the optical add tap 512 may be implemented with a multiple-input optical combiner. The multiple-input optical combiner may be tunable.

In a further embodiment, the functionalities of corresponding optical add tap 512 and optical combiner 504 may be combined by a single optical combiner. For example, the single optical combiner may include inputs more than necessary for connection to the plurality of filtered signals from the corresponding signal switching devices 306 (for example, more than N). As such, the extra input may be used to receive signals from the local source. The single optical combiner may be tunable.

It should be noted that if the single optical combiner includes more than N inputs, it ensures that an extra input is available for connection to the local source. However, this is not strictly necessary. The single optical combiner may include N or less inputs if the WSS fabric 500 is not fully connected. For example, the single optical combiner may not need to be have inputs connected to each and every output of the corresponding signal switching device 506. All that is required is that the single optical combiner include more inputs than necessary to connect to the desired outputs of the corresponding signal switching device 506.

As noted above, the WSS fabric 500 includes arbitrary add/drop capability. For example, if the same channel is blocked for all the RBFs in a particular signal switching device 506, then no wavelength at that channel is selected from any input port for this output port. As a result, this particular wavelength can be added locally through the optical drop tap 510 (channel-dropping is automatically achieved through tapping). Since there is no limitation to choose which channel and how many channels can be totally blocked by the switch fabric, arbitrary add/drop is achieved.

Figure 6A:
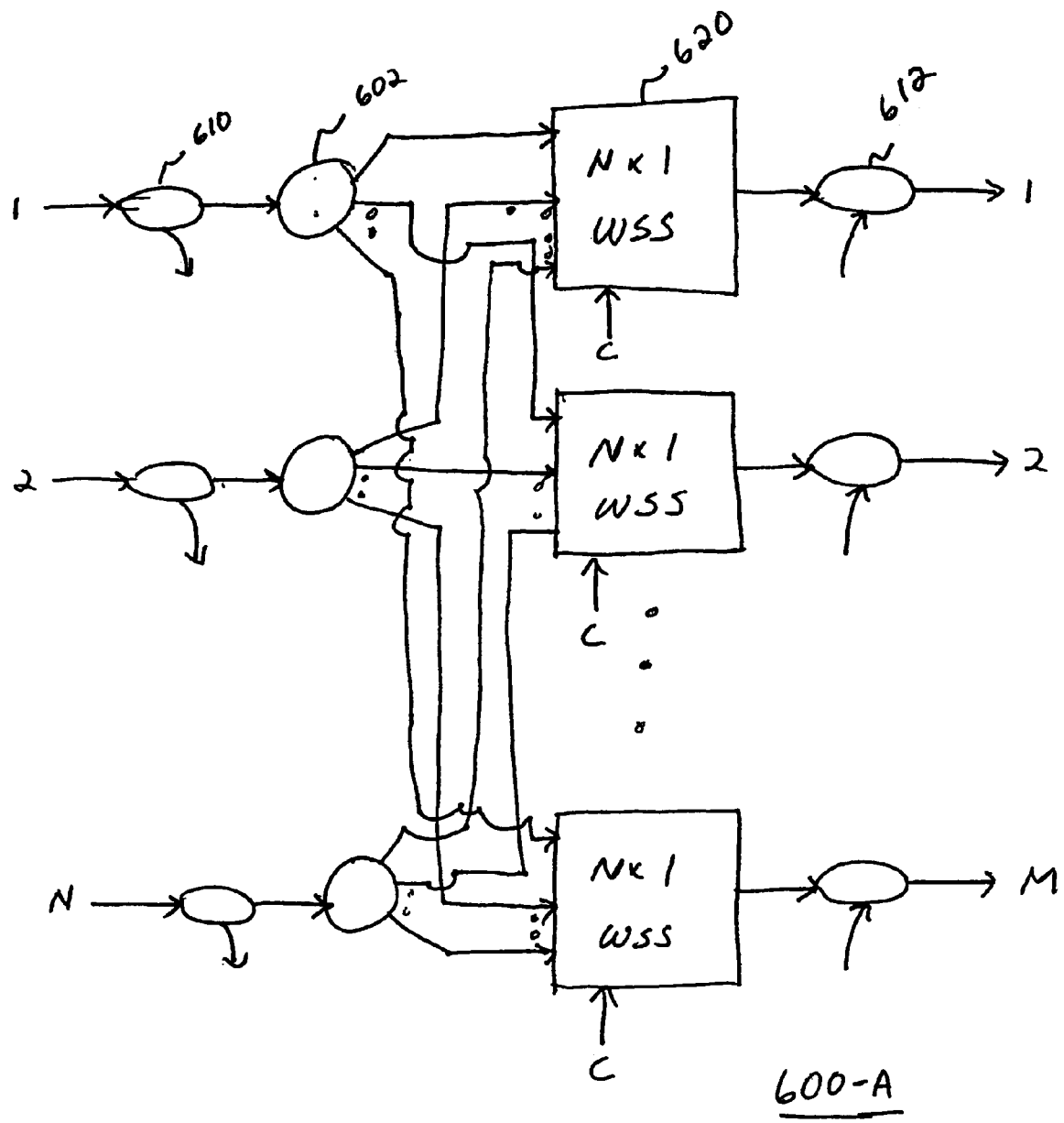
FIG. 6A illustrates a flexible wavelength selective fabric with arbitrary add/drop capability utilizing N×1 wavelength selective switches according to an embodiment of the present invention.

In an alternative design, combination of the RBF based signal switching device 306, 506 and optical combiner 304, 504 may be replaced by a N×1 integrated wavelength selective switch. FIG. 6A illustrates this concept. In FIG. 6A, the WSS fabric 600-A may include a plurality of optical drop taps 610, optical drop splitters 602, and optical add taps 612.

In addition, the WSS fabric 600-A may also include a plurality of N×1 (N input, one output) wavelength selective switches 620. In a fully connected N×M WSS fabric 600-A, M N×1 WSS 620 could be utilized. As can be determined when WSS fabric 500 and 600-A are compared, each N×1 WSS 620 performs a function similar to that performed by a combination of the signal switching device 506 and the optical combiner 504. In other words, the N×1 WSS 620 receives inputs from the optical splitters 620, selectively filters one or more signals received from the optical splitters 620, and outputs the result.

Like the situation with the WSS fabric 500 of FIG. 5, optical drop tap 610 of FIG. 6A may be implemented with a simple optical coupler or with a multiple-output optical splitter. Also the combination of the optical drop tap 610 and the optical splitter 602 may be implemented by a single multiple-output optical splitter. Further, the single multiple-output optical splitter may be tunable.

Further, the optical add tap 612 may be implemented with a coupler or with a multiple-input optical combiner. The multiple-input optical combiner may be tunable.

In another alternative design, combination of the optical splitter 302, 502 and RBF based signal switching device 306, 506 may be replaced by a 1×M integrated wavelength selective switch. FIG. 6B illustrates this concept. In FIG. 6B, the WSS fabric 600-B may include a plurality of optical drop taps 610, optical drop combiners 604, and optical add taps 612.

In addition, the WSS fabric 600-B may also include a plurality of 1×M (1 input, M output) wavelength selective switches 630. In a fully connected N×M WSS fabric 600-B, N 1×M WSS 630 could be utilized. As can be determined when WSS fabric 500 and 600-B are compared, each 1×M WSS 630 performs a function similar to that performed by a combination of the optical splitter 502 and the signal switching device 506. In other words, the 1×M WSS 630 selectively filters the inputs from the external sources and directs the result to one or more of its M outputs. Each optical combiner 604 may combine the filtered outputs from some or all 1×M WSS 630 and output the result.

Like the situation with the WSS fabric 500 of FIG. 5, optical add tap 612 of FIG. 6B may be implemented with a simple optical coupler or with a multiple-input optical combiner. Also the combination of the optical add tap 612 and the optical combiner 604 may be implemented by a single multiple-input optical combiner. Further, the single multiple-input optical combiner may be tunable.

Further, the optical drop tap 610 may be implemented with a coupler or with a multiple-output optical splitter. The multiple-input optical combiner may be tunable.

Figure 6C:
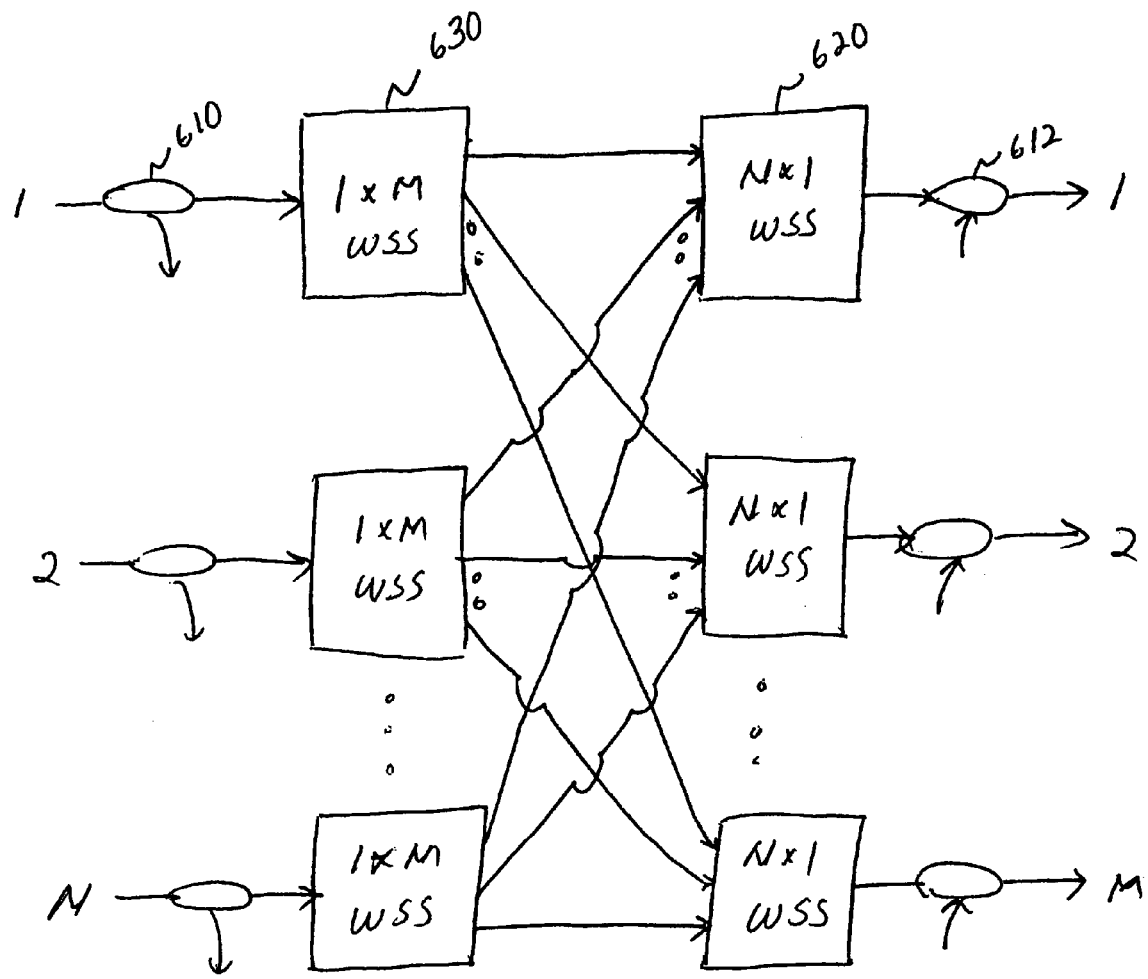
FIG. 6C illustrates a flexible wavelength selective fabric with arbitrary add/drop capability utilizing N×1 and 1×M wavelength selective switches according to an embodiment of the present invention.

In yet another alternative design, both the 1×M WSS 630 and N×1 WSS 620 may be utilized. FIG. 6C illustrates this concept. In FIG. 6C, the WSS fabric 600-C may include a plurality of optical drop taps 610 and optical add taps 612.

In addition, the WSS fabric 600-C may also include a plurality of 1×M WSS 630 and N×1 WSS 620. In a fully connected N×M WSS fabric 600-A, N 1×M WSS 630 and M N×1 WSS 620 could be utilized. As can be determined when WSS fabric 500 and 600-C are compared, the combination of the 1×M WSS 630 and N×1 WSS 620 perform functions of the optical splitter 502, the signal switching device 506, and the optical combiner 504. Each 1×M WSS 630 may selectively filter the input from the corresponding external source and directs the result to one or more of its M outputs. Each N×1 WSS 620 may selectively filter some or all signals received from the 1×M WSS 630 and output the result.

Further, the optical drop taps 610 may be implemented with a coupler or with a multiple-output optical splitters and the optical add taps 612 may be implemented with a coupler or with a multiple-input optical combiner. One or both of the multiple-output optical splitter or the multiple-input optical combiner may be tunable.

While the invention has been described with reference to the exemplary embodiments thereof, it is to be understood that various modifications may be made to the described embodiments without departing from the spirit and scope of the invention thereof. The terms as descriptions used herein are set forth by way of illustration only and are not intended as limitations.

What is claimed is:

1. A method of optimizing a Wavelength Selective Switch ("WSS") fabric, comprising:
    providing a plurality of optical splitters, each optical splitter receiving a corresponding input optical signal from a corresponding external source and splitting the received signal into a plurality of split signals;
    providing a plurality of reconfigurable blocking filters (RBF) grouped in groups of RBFs, each group possessing a plurality of optical inputs, receiving a split signal from the optical splitters, and optical outputs outputting the filtered versions of the split signals;
    providing a plurality of optical combiners, wherein each combiner receives the plurality of the filtered versions of the split signals from the plurality of optical outputs from each group of the RBFs, combines the received plurality of the filtered versions of the split signals and outputs the combined signal to external optical components; and
    optimizing the WSS flexibility by adjusting transmission profiles of the RBFs in accordance with control signals received from external controllers;
    where transmission profile of at least one RBF is adjusted to be seamless, with no gaps in channel wavelength spacing between adjacent channels, small attenuation, and with small group delay ripple to support optical signals with multiple channel spacings and multiple transmission rates.

2. The method of claim 1, where the adjusting of the transmission profiles of the RBFs in accordance to control signals received from external controllers is achieved dynamically where the transmission profile of the RBFs is changed without stopping the operations of the RBFs.

3. The method of claim 1, where the attenuation is less than 0.2 dB.

4. The method of claim 1, where the group delay ripple is less than 3 ps.

5. The method of claim 1, where the optical signals with multiple channel spacings include channel spacings of: 25 GHz, 50 GHz, 100 GHz, and any combination of the listed channel spacings.

6. The method of claim 1, where the optical signals with multiple transmission rates include transmission rates of: 2.5 Gb/s, 10 Gb/s, 40 Gb/s, and any combination of the listed transmission rates.

7. A method of improvement of reliability of a WSS fabric, comprising:
  providing a plurality of optical splitters where each optical splitter is configured to receive a corresponding input optical signal from a corresponding external source and to split the received signal into a plurality of split signals,
  providing a plurality of reconfigurable blocking filters (RBF) grouped in groups of RBFs, each group possessing plurality of optical inputs, configured to receive a split signal from the optical splitters, and optical outputs to output the filtered versions of the split signals, and
  providing a plurality of optical combiners wherein each combiner is configured to receive the plurality of the filtered versions of the split signals from the plurality of optical outputs from each group of the RBFs, combine the received plurality of the filtered versions of the split signals and output the combined signal to external optical components;
  wherein the improvement of reliability is achieved by setting of all RBFs default states to be "blocking" to minimizes the impact of failure of RBFs in the WSS fabric.

8. A method of achieving an arbitrary drop of any chosen channel in a WSS fabric with no changes in hardware, said method comprising:
  providing a plurality of optical splitters where each optical splitter is configured to receive a corresponding input optical signal from a corresponding external source and to split the received signal into a plurality of split signals;
  providing a plurality of reconfigurable blocking filters (RBF) grouped into groups of RBFs, each group possessing plurality of optical inputs, configured to receive a split signal from the optical splitters, and optical outputs to output the filtered versions of the split signals; and
  providing a plurality of optical combiners wherein, each combiner is configured to receive the plurality of the filtered versions of the split signals from the plurality of optical outputs from each group of the RBFs, combines the received plurality of the filtered versions of the split signals and output the combined signal to external optical components;
  wherein the arbitrary drop of any chosen channel is achieved by adjusting transmission profiles of any group RBFs in accordance to control signals received from external controllers to block any chosen channel and transmit no signal in any chosen channel in the filtered version of the split signals to the optical combiner.

9. The method of claim 8, where the adjusting of the transmission profiles of the RBFs in accordance to control signals received from external controllers is achieved dynamically where the transmission profile of the RBFs is changed without stopping the operations of the RBFs.

* * * * *